United States Patent [19]

Takayama et al.

[11] Patent Number: 5,069,112
[45] Date of Patent: Dec. 3, 1991

[54] DAMPER CONTROL ARRANGEMENT

[75] Inventors: Yukio Takayama; Yuko Yuge, both of Shizuoka, Japan

[73] Assignee: Nihon Plast Co., Ltd., Shizuoka, Japan

[21] Appl. No.: 362,807

[22] Filed: Jun. 7, 1989

[51] Int. Cl.[5] .................. G05G 5/06; B60H 1/00
[52] U.S. Cl. ........................... 98/69; 74/531; 98/277
[58] Field of Search ............... 98/121.2, 2.11, 40.24, 98/40.28, 2, 110; 74/531, 504, 511, 553

[56] References Cited

U.S. PATENT DOCUMENTS

| 2,729,114 | 7/1954 | Young | 74/531 |
| 3,103,155 | 10/1963 | Boylan et al. | 98/2.19 |
| 3,388,654 | 6/1968 | Aldrich, Jr. et al. | 98/2.18.2 |
| 3,898,921 | 8/1975 | Trube et al. | 98/2.40.2 |
| 4,896,557 | 1/1990 | Nagano | 74/531 |
| 4,919,004 | 4/1990 | Nagano | 74/531 X |

FOREIGN PATENT DOCUMENTS

| 2204480 | 8/1973 | Fed. Rep. of Germany | 74/553 |
| 922422 | 5/1965 | United Kingdom . | |
| 1296921 | 8/1972 | United Kingdom . | |
| 1320695 | 6/1973 | United Kingdom . | |
| 2108263 | 5/1983 | United Kingdom . | |

Primary Examiner—Albert J. Makay
Assistant Examiner—Willian Doerrler
Attorney, Agent, or Firm—Bachman & LaPointe

[57] ABSTRACT

A damper control arrangement employs friction in providing appropriate resistance against motion of a manual operator as manually operated and thereby provide proper stiff feeling for a manual operator. The friction is provided by a resilient or elastic friction member which is coupled with a louver assembly with the manual operator with frictional engagement therewith by a tightening torque of fastener.

10 Claims, 2 Drawing Sheets

DAMPER CONTROL ARRANGEMENT

BACKGROUND OF THE INVENTION

1. Field of the Invention

The present invention relates generally to a damper control arrangement for manually operating a louver of a damper for adjusting flow direction and/or flow amount of air. More specifically, the invention relates to a damper control arrangement which is suitable to be employed in an automotive air conditioner system for controlling discharge of conditioning air into a vehicular cabin.

2. Field of the Invention

As is well known, automotive air conditioner systems employ a sort of damper for selectively discharging conditioning air into the vehicular cabin. Each damper is associated with a louver which is mechanically coupled with damper control mechanism so as to mechanically control the louver position depending upon the discharge mode of the air conditioner system. In addition, some of the dampers, such as those used in chest vent or vent outlet, are provided capability of direct access to louvers via a louver associated operation lever or operation dial in order to permit the passengers in the vehicular cabin to adjust the discharge direction and/or flow amount of the conditioning air.

Such manually operable damper control arrangements for the automotive air conditioner system have been disclosed in Japanese Utility Model First (unexamined) Publications (Jikkai) Nos. 55-166347 and 60-135218. The damper control arrangements disclosed in these published Japanese Utility Model Applications, comprise damper housings defining conditioning air paths and louver assemblies disposed within the damper housing and operable for varying the angular position for controlling flow direction and/or flow amount of conditioning air. The louver assembly is associated with a manually operable operation lever or operation dial via a boss extending therefrom. The operation lever or dial is connected to the boss directly by means of a screw or via an elastic body, such as bushing. In such conventional arrangements, the operational torque for manually controlling angular position of louver or louvers of the louver assembly can fluctuate depending upon tightening torque of the screw. Therefore, operational torque cannot be stable to degrade operation feeling.

The aforementioned Jikkai 60-135218 has therefore proposed avoidance of degradation operation feeling by providing a click mechanism. In the proposed construction, notching or recesses are formed in one of a bushing and manual operator, e.g. operation lever or operation dial, and click member, such as a ball is provided to the other of the bushing and manual operator. The proposed click mechanism is successful to provide click feeling for one predetermined direction of louver operation. However, since the manual operator is supported by means of the bushing at the pivoting center and establish click engagement at a position offset from the pivoting center, fluctuation of operational torque is caused when composite operational force in more than one operational direction is exerted on the manual operator. Therefore, such prior proposed arrangement is not satisfactory to provide stable operation of the damper and thus provide good operation feeling.

SUMMARY OF THE INVENTION

Therefore, it is an object of the present invention to provide a damper control arrangement which can solve the problems in the prior art and provide good operation feeling.

In order to accomplish aforementioned and other objects, a damper control arrangement, according to the present invention, employs a friction in providing appropriate resistance against motion of a manual operator as manually operated and thereby provide proper stiff feeling for a manual operator. The friction is provided by a resilient or elastic friction member which is coupled with the manual operator with frictional engagement therewith by a tightening torque of fastener.

Acccording to one aspect of the invention, a damper control arrangement comprises:

first means, mechanically associated with a louver of a damper assembly, for causing angular displacement of the louver according to angular position thereof;

second means, including a member extended from a damper housing which pivotally houses the louver, for permitting manual access, for adjusting the angular position of the louver;

third means for supporting the second means in a manner permitting angular displacement thereof, the third means having a planar end surface establishing frictional engagement with a first surface of the second means; and fourth means, provided at a side opposite to the third means with respect to the second means, for exerting depressing force for depressing the second means toward the third means, and the fourth means including a surface contacting with a second surface of the second means lying opposite to the first surface for establishing frictional contact.

The third means may be formed on the peripheral wall of the damper housing. The third means may comprise a center boss and annular projection projecting from the outer periphery of the peripheral wall of the damper housing and arranged coaxially with each other, the second means engages with the center boss in such a manner that the second means is permitted to cause angular displacement thereabout, and the annular projection forms a surface to establish surface contact with the first surface.

The damper control arrangement may further comprise a spacer ring disposed between the tip end surface of the annular projection and the first surface. The spacer ring is formed of a synthetic resin. The fourth means may comprise a center boss section about which the second means is permitted to cause angular displacement and an annular contact section formed concentrically to the center boss section and having the surface to contact with the second surface of the second means. The center boss section and annular contact section may be connected by at least one elastic web section. Preferably, the center boss section and annular contact section are connected by a plurality of radially extending elastic web section. The second means defines an annular area to contact with the annular contact section.

The annular contact section has a circumferential edge portion having the contacting surface and the annular area is defined in a groove formed on the second surface of the second means, which groove receives the circumferential edge portion. The center boss section, the annular contact section and the web sections are integrally formed of a synthetic resin.

BRIEF DESCRIPTION OF THE DRAWINGS

The present invention will be understood more fully from the detail description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
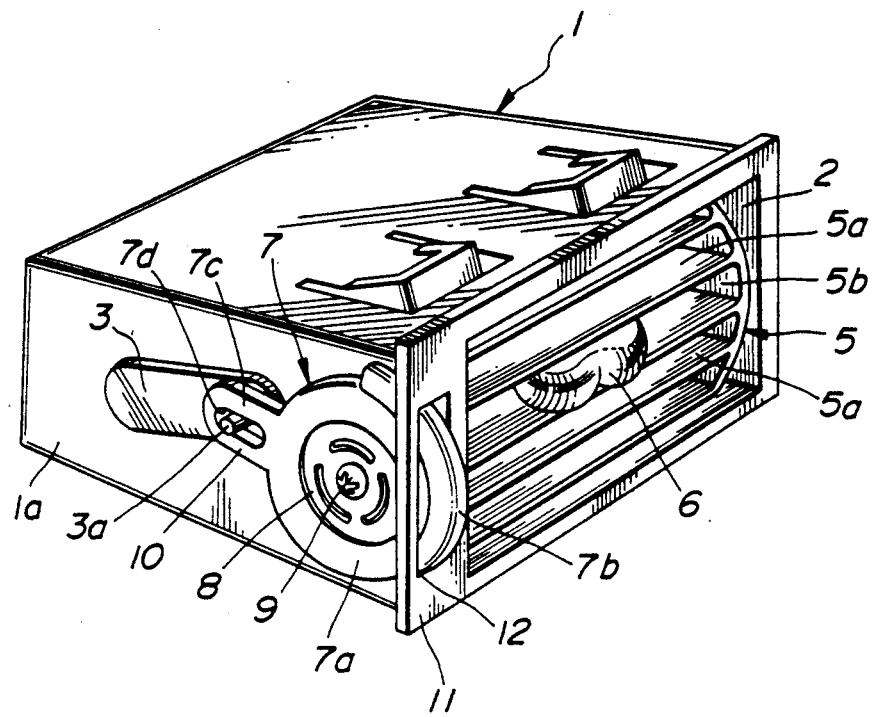
FIG. 1 is a perspective view of a damper assembly employing the preferred embodiment of a damper control arrangement according to the present invention.

Referring now to the drawings, FIG. 1 shows a damper assembly which is used for forming a center vent or side vent to be mounted on an instrument panel of an automotive vehicle. Similar construction of the damper assembly may also be used for side defroster outlet or rear seat outlet. Though the following discussion will be given for specific construction of the damper assembly in order to facilitate better understanding of the invention, it should be appreciated that the construction of the damper assembly per se is not essential to the present invention and the damper control arrangement according to the present invention is applicable for various constructions of damper assembly. Furthermore, while the shown embodiment is directed to a damper assembly a for conditioning air discharge outlet of an automotive air conditioner system, the damper control arrangement according to the present invention will be applicable not only for the automotive air conditioner system but also various damper assemblies which requires manual flow control, such as air conditioner system for a building, house or so forth.

Referring now to FIG. 1, the damper assembly comprises a damper housing 1 which is formed of a synthetic resin and is formed into front and rear end opened box shaped configuration. The rear end of the damper housing is communicated with a conditioning air passage (not shown) to be supplied with conditioning air. A vertical flow direction control louver assembly 5 is installed on the front end opening serving as conditioning air outlet opening 2 for controlling vertical conditioning air flow direction. The vertical flow direction control louver assembly 5 is formed of a synthetic resin by molding and is provided with a plurality of horizontally extending louvers 5a which are integrally formed with side walls 5b (only one is shown in the drawings). The horizontally extending louvers 5a are parallel to each other and maintain predetermined horizontally extending clearances. The side walls 5b are rotatably mounted on side walls 1a of the damper housing 1 so as to permit angular displacement of the louver assembly 5 for vertical flow direction adjustment in a predetermined angular range in vertical direction.

Though not shown on the drawings, a transverse flow direction control louver assembly is provided behind the vertical flow direction control louver assembly 5. The transverse flow direction control louver assembly is constructed as per se well known construction and associated with a manual operator 6. The manual operator 6 serves as common operating member for both of the vertical flow direction control louver assembly 5 and the transverse flow direction control louver assembly. Therefore, the manual operator 6 is extended frontwardly from one of the clearances between horizontally extending louvers 5a. This manual operator 6 is operable both a in vertical direction to cause rotational movement of the vertical flow direction control louver assembly 5 for adjustment of the vertical flow direction of the conditioning air and in a transverse or horizontal direction for causing pivotal movement of the transverse flow direction control louvers for adjustment of the transverse flow direction of the conditioning air.

In addition, the shown damper assembly employs a flow amount control louver assembly (not shown) in the vicinity of the rear end opening of the damper casing. The louver 13 of the flow amount control louver assembly is designed for adjusting the path area of the conditioning air between a fully closed position and a fully open position. The louver assembly is coupled with an actuation lever 3 provided outside of the side wall 1a of the damper housing 1 and pivotally supported thereon. The actuator lever 3 is provided with a connection pin 3a laterally projecting from the outer surface thereof.

A manual operator 7 is coupled with the actuator lever 3 for permitting manual adjustment of the conditioning air flow amount. The manual operator 7 comprises a generally circular disc shaped main body 7a with a bulged section 7b with notched circumferential surface, and a rearward extension 7c with an elongated opening 7d. The connecting pin 3a of the actuator lever 3 is received within the elongated opening 7d of the extension 7c so as to couple the actuator lever with the manual operator 7. The bulged section 7b is extending from a cut-out opening 12 formed through a flange section 11 of the damper housing 1 so that it may be accessed from the outside of the damper housing for permitting manual adjustment of the conditioning air flow amount.

Figure 2:
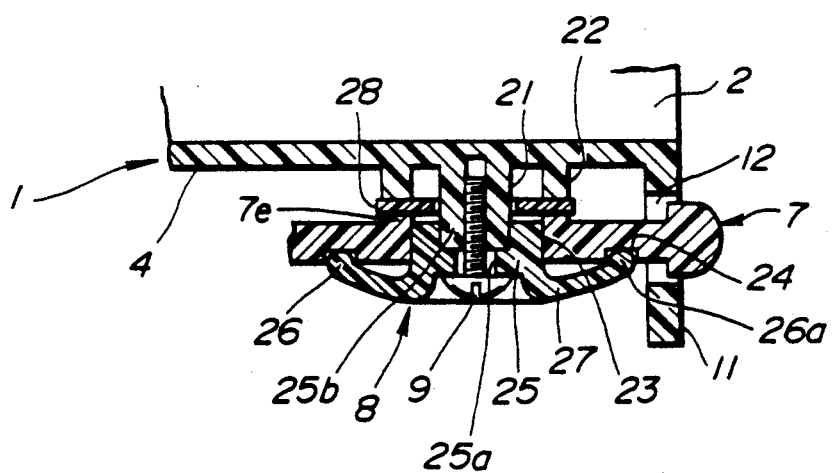
FIG. 2 is an enlarged section of major part of the damper assembly, showing the detailed construction of the preferred embodiment of the damper control arrangement according to the invention.
Figure 3:
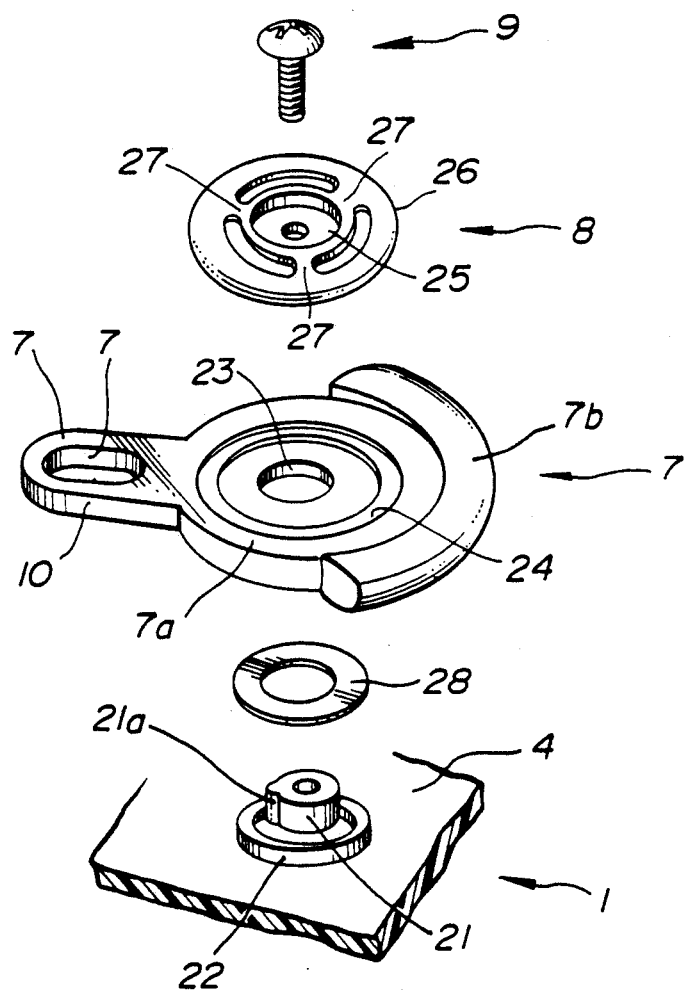
FIG. 3 is a exploded perspective view of the preferred embodiment of the damper control arrangement of FIG. 2.

The main body 7a is formed with a center opening 23 and an annular groove 24 which is formed coaxially with the center opening and on the outer surface of the main body. An elastic friction plate 8 is provided at outside of the main body 7a of the manual operator 7. The friction plate 8 is formed of a synthetic resin, such as polyacetal. The friction plate 8 is formed to have a coaxially arranged bush section 25 and an outer ring section 26 connected to the bush section via flexible webs 27 as shown in FIGS. 2 and 3. As particularly seen from FIG. 2, the outer ring section 26 has outer end edge 26a engaging with the annular groove 24 of the main body 7a of the manual operator. On the other hand, the bushing section 25 has an external diameter conforming with the center opening 23 of the main body 7a.

The bushing section 25 is formed with a center opening 25a which opens to an essentially circular recess 25b formed on the inner surface thereof. The circular recess 25b serves as receptacle for the front end of a boss 21 which extends from the outer periphery of the side wall 1a of the damper housing 1. As seen in FIG. 3, the boss 21 is formed with a keying projection 21a. On the other hand, the recess 25b is integrally formed with a keying groove (not clearly shown) for receiving the keying projection 21a of the boss 21. Therefore, the friction plate 8 as engaged with the boss 21 at the bushing section 25 is prevented from rotating. An annular projection 22 is formed coaxially with the boss 21 on the outer periphery of the side wall 1a. The annular projection 22 has a contact surface 22a which an annular projection 7e projecting from the inner surface of the main body 7a of the manual operator 7. The annular projections 22 and 7e mate each other via a resin spacer ring 28.

The friction plate 8 and the manual operator 7 are secured on the boss 21 by means of a fastening screw 9 to permit the manual operator to rotate thereabout. In assembling, the fastening screw 9 is tightened to load a certain stress to the friction plate 8 for depressing the outer end edge 26a of the outer ring section 26 onto the annular groove 24. On the other hand, by the elastic force exerted through the outer end edge 26a of the outer ring section 26 of the friction plate 8, the manual operator 8 is depressed toward the spacer ring 28 to establish frictional face engagement. This frictional engagement between the annular projection 7e and the spacer ring 28 is cooperative with the frictional engagement between the outer end edge 26a and the groove 24 to generate a reacting torque against manual operation torque to be exerted on the manual operator 7 for providing proper stiffness in adjustment of the conditioning air flow rate.

As can be appreciated, the shown embodiment of the damper control arrangement can thus provide stable operation in controlling the louver position of the damper. Furthermore, even when the manual operational force is exerted in a direction different from that to operate the louver, the manual operator 7 may not cause shifting in the force exerting direction and assure stable louver adjustment operation. In addition, since the friction plate can be elastically engaged with the manual operator 7 for elastically providing the frictional force, the tightening torque fluctuation of the fastening screw may not affect the stiffness of the manual operator. Furthermore, since the friction plate 8 which is fimly secured to the boss 21 in accurate alignment of its axis with the axis of the boss and engage with the annular groove 24 of the manual operator 8 at the outer circumferential edge, concentricity can be maintained even when a sight clearance or tolerance exists between the outer periphery of the bushing 25 and the center opening of the manual operator, or the play is formed therebetween by wearing.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiment is directed to the dial type manual operator for controlling the conditioning air flow amount adjustment, it can be replaced with a manual operation lever. Furthermore, though the shown embodiment employs separate louvers for controlling transverse air flow direction and conditioning air flow amount, those action can be taken place by common louver assembly. Even for controlling such multi-action louver assembly, the damper control system according to the present invention will be effective for providing satisfactory stability in louver control.

What is claimed is:

1. A damper control arrangement comprising:
   first means for causing angular displacement of a damper louver according to angular position thereof;
   second means, including a member extended from a damper housing which pivotally houses said louver, for permitting manual access, for adjusting the angular position of said louver;
   third means for supporting said second means in a manner permitting angular displacement thereof, said third means having an end surface establishing frictional engagement with a first surface of said second means; and
   fourth means, provided at a side opposite to said third means with respect to said second means, for exerting depressing force for depressing said second means toward said third means, and said fourth means including a center boss section about which said second means is permitted to cause angular displacement and an annular contact section formed concentrically to the center boss section and having a surface contacting with a second surface of said second means lying opposite to said first surface for establishing frictional contact.

2. A damper control arrangement as set forth in claim 1, wherein said third means is formed on the peripheral wall of said damper housing.

3. A damper control arrangement as set forth in claim 2, wherein said third means comprises a center boss and annular projection projecting from the outer periphery of said peripheral wall of said damper housing and arranged coaxially with each other, said second means engages with said center boss in such a manner than said second means is permitted to cause angular displacement thereabout, and said annular projection forms a surface to establish surface contact with said first surface.

4. A damper control arrangement as set forth in claim 3, which further comprises a spacer ring disposed between said tip end surface of said annular projection and said first surface.

5. A damper control arrangement as set forth in claim 4, wherein said spacer ring is formed of a synthetic resin.

6. A damper control arrangement as set forth in claim 1, wherein said center boss section and annular contact section are connected by at least one elastic web section.

7. A damper control arrangement as set forth in claim 1, wherein said center boss section and annular contact section are connected by a plurality of radially extending elastic web section.

8. A damper control arrangement as set forth in claim 7, wherein said second means defines an annular area to contact with said annular contact section.

9. A damper control arrangement as set forth in claim 8, wherein said annular contact section has a circumferential edge portion having said contacting surface and said annular area is defined in a groove formed on said second surface of said second means, which groove receives said circumferential edge portion.

10. A damper control arrangement as set forth in claim 9, wherein said center boss section, said annular contact section and said web sections are integrally formed of a synthetic resin.

* * * * *